US012627149B2

(12) United States Patent
Meghnous et al.

(10) Patent No.: US 12,627,149 B2
(45) Date of Patent: May 12, 2026

(54) METHOD OF ACTIVE AND REACTIVE POWER CONTROL IN ABC FRAME OF A GRID-TIED CONVERTER

(71) Applicant: WATT & WELL, Perthuis (FR)

(72) Inventors: Ahmed Rédha Meghnous, Epinay sur Orge (FR); Jean-Christophe Calamote, Le Chesnay (FR)

(73) Assignee: WATT & WELL, Perthuis (FR)

( * ) Notice: Subject to any disclaimer, the term of this patent is extended or adjusted under 35 U.S.C. 154(b) by 224 days.

(21) Appl. No.: 18/194,226

(22) Filed: Mar. 31, 2023

(65) Prior Publication Data

US 2023/0318297 A1 Oct. 5, 2023

(30) Foreign Application Priority Data

Mar. 31, 2022 (EP) ..................................... 22165751

(51) Int. Cl.
| | |
|---|---|
| *H02J 3/18* | (2026.01) |
| *B60L 53/62* | (2019.01) |
| *H02J 3/1878* | (2026.01) |
| *H02J 7/00* | (2026.01) |
| *H02M 1/42* | (2007.01) |
| *H02M 3/00* | (2006.01) |
| *H02M 3/335* | (2006.01) |

(52) U.S. Cl.
CPC ............ *H02J 3/1878* (2013.01); *B60L 53/62* (2019.02); *H02J 7/00712* (2020.01); *H02M 3/33584* (2013.01); *H02M 1/4233* (2013.01); *H02M 3/01* (2021.05)

(58) Field of Classification Search
CPC .............. H02J 3/1878; H02J 7/00712; H02M 3/33584; H02M 1/4233; H02M 3/01; B60L 53/62
USPC ........................................................ 323/212
See application file for complete search history.

(56) References Cited

U.S. PATENT DOCUMENTS

| | | | | |
|---|---|---|---|---|
| 6,118,678 A | * | 9/2000 | Limpaecher | ........ H02M 5/4505 |
| | | | | 363/60 |
| 2015/0365003 A1 | * | 12/2015 | Sadwick | ................. H02M 3/28 |
| | | | | 363/21.01 |

(Continued)

FOREIGN PATENT DOCUMENTS

| | | |
|---|---|---|
| JP | 2020502967 A | 1/2020 |

OTHER PUBLICATIONS

European Search Report for EP 22165751, dated Sep. 7, 2022.

(Continued)

*Primary Examiner* — Thienvu V Tran
*Assistant Examiner* — Lauren Ashley Shaw
(74) *Attorney, Agent, or Firm* — Jordan IP Law, LLC; Todd A. Vaughn

(57) ABSTRACT

A method for controlling active and reactive powers in grid-tied converters having a grid side and a battery side, in which said grid side supplies an alternative current to said converter whereas the battery side receives a direct current from said converter, said method comprising direct active and reactive power control in ABC frame where no transformation is used, and wherein active power is controlled by controlling the battery charging and discharging currents, and reactive power is controlled by controlling the phase shift between power factor correction current and voltage.

8 Claims, 10 Drawing Sheets

(56) References Cited

U.S. PATENT DOCUMENTS

| 2016/0016479 | A1* | 1/2016 | Khaligh | H02M 1/4258 |
| | | | | 336/170 |
| 2020/0070672 | A1* | 3/2020 | Vahedi | B60L 53/63 |
| 2020/0324665 | A1* | 10/2020 | Mackenzie | B60L 53/22 |
| 2021/0155100 | A1 | 5/2021 | Khaligh | |

OTHER PUBLICATIONS

Giglia et al., "Comparison of Control Techniques for Three-Phase Distributed Generation Based on VOC and DPC," Renewable Energy and Power Quality Journal, 2008, vol. 1 (6), 659-666, https://doi.org/10.24084/repqj06.401.

* cited by examiner

906

Switching bridge
(full bridge)
902

LLC tank

903

Transformer and
rectifier
904

Output
capacitor
905

PWM in burst control mode

METHOD OF ACTIVE AND REACTIVE POWER CONTROL IN ABC FRAME OF A GRID-TIED CONVERTER

CROSS-REFERENCE TO RELATED APPLICATIONS

The present application claims priority 35 U.S.C. § 119 to European Patent Publication No. DE 102021210616.1 (filed on Mar. 31, 2022), the contents of which is hereby incorporated by reference in its complete entirety.

TECHNICAL FIELD

The present invention relates to power electronics, and in particular to grid-tied converters such as battery chargers, in particular for use with electrical vehicles. Battery chargers for use with electrical vehicles are composed of two power stages: an AC/DC converter and a DC/DC converter. The present invention relates in particular to a method for active and reactive power direct control in ABC frame of grid tied converters, in particular in relation with power factor correction in DC/DC converters.

BACKGROUND

Bidirectional battery chargers for electrical vehicles capable of Grid-to-Vehicle (G2V) and Vehicle-to-Grid (V2G) operations have attracted great interest these last years within smart grid applications. An accurate control of active and reactive powers remains necessary to ensure stable integration of a high number of chargers in smart and micro-grids. Most of existing control techniques are based on instantaneous power theory (commonly called «PQ theory») where dq frame transformation for three phase converters and then active and reactive powers control turns to direct and quadrature current control; this approach has been proposed by L. P. Sampaio et al. ("*Grid-tie three-phase inverter with active and reactive power flow control capability*", published in Electrôn. Potôn., Campo Grande, v. 19, n. 4, p. 397-405 (2014)).

PQ theory can also be adapted to single phase converters, as proposed by S. Peng, A. Luo, Z. Lv, J. Wu and L. Yu, "Power control for single-phase microgrid based on the PQ theory" (2011 6th IEEE Conference on Industrial Electronics and Applications, Beijing, 2011, pp. 1274-1277.

The main drawback of these techniques is the utilization of the dq transformation that assumes that the grid is balanced. In case of imbalance, it is necessary to consider positive, negative and zero sequences of currents and voltages which means the transformation must be calculated three times and all control loops must be tripled. This has a huge impact on the CPU load of the employed digital controller or DSP, for computation and control implementation, where a more performant calculator is needed, which will increase the cost of the charger.

The aim of the present invention is to propose a new control strategy that is capable of reducing the computation burden of the CPU and to use common power control strategy for single and three phase converters of battery chargers for electrical vehicles (EV).

A known solution to this problem is based on the idea to control directly and in a decoupled way the active and reactive power exchanged by the inverter with the electrical grid, avoiding any current control; this is called Direct Power Control (DPC). A comparison of different control techniques using DPC is given in G. Giglia et al., «Comparison of Control Techniques for Three-Phase Distributed Generation Based on VOC and DPC», Renewable Energy and Power Quality Journal vol. 1 no 6, p. 659-666, (2008) (doi.org/10.24084/repqj06.401).

The main disadvantage of DPC is that it is a hysteresis based control method, which causes problems related to electromagnetic compatibility (EMC) leading to unwanted chattering noise, significant harmonic content and high Total Harmonic Distortion (THD). As a consequence, DPC is not a satisfactory solution in many cases.

SUMMARY

According to the invention, the problem is solved by a method using direct active and reactive power control in ABC frame where no transformation is used. This reduces the computation burden and also enhances harmonic content by current shaping. The strategy is developed for a grid-tied charger comprising a bidirectional resonant DC/DC converter using Power Factor Correction (PFC) (see FIG. 1).

More precisely, a first object of the invention is a method for controlling active and reactive powers in grid-tied converters, comprising direct active and reactive power control in ABC frame where no transformation is used, and wherein active power is controlled by controlling the battery charging and discharging currents, and reactive power is controlled by controlling the phase shift between PFC current and voltage.

Another object of the invention is a circuit topology for carrying out said method.

Active power is the real power transformed to actual physical work by the DC/DC stage load (EV battery); this is the power consumed by the battery upon charging or delivered by the battery to the grid. According to the invention, the active power control is achieved by controlling the battery charging and discharging currents.

The reactive power control is achieved by controlling the phase-shift between PFC current and voltage at the AC side of the converter. This can be done through a linearized control loop that uses the linear relationship between reactive power and small phase-shift angle (typically less than 0.5 rad) to control reactive power by acting directly on the phase-shift between grid current and grid voltage.

In a typical embodiment, said linearized control loop uses the linear relationship between grid side reactive power and small phase-shift angle comprised between +0.451 rad and −0.451 rad, and the grid-tied converter is designed such that the converter has a maximum power of about 11 kW, and the reactive power controller capability is about +/−4.8 kVa, and the controller is designed such as to be able to control the power factor up to 0.9 on each phase independently. Controlling the phases independently allows to use the same method in single phase operation and in three-phase operation.

Both power control loops are decoupled, no transformation is used, and currents are shaped by inner current loops. This reduces computation burden.

In particular, the invention is embodied by a method (and by a topology allowing to carry out said method) for controlling injection and absorption of grid side active and reactive powers in grid-tied converters having a grid side and a battery side, in which said grid side supplies an alternative current to said converter whereas the battery side receives a direct current from said converter, said method comprising direct active and reactive power injection or absorption control from or to grid side in ABC frame where no transformation is used, and wherein absorbed active power is controlled by controlling the battery charging current, and wherein injected active power is controlled by controlling the discharging currents, and reactive power is controlled by controlling the phase shift angle between power factor correction current and voltage for each grid phase. Advantageously, each grid phase is controlled independently in terms of grid side active and reactive powers.

Said method and topology can be used advantageously in bidirectional converters, such as bidirectional battery chargers. In such devices, the term "power injection" is to be understood as expressing a direction from the battery to the grid (passing through the converter), and the term "power absorption" is to be understood as expressing a direction from the grid to the battery (passing through the converter).

In specific embodiments of the invention, the phase shift between PFC current and voltage is controlled using a linearized control loop. In particular, said linearized control loop can use a linear relationship between reactive power and small phase-shift angle, wherein "small" means here the range of angles in which said linear relationship is approximately valid (typically less than +/−0.5 rad, and preferably no more than +/−0.451 rad).

One exemplary embodiment of the disclosed subject matter is an active and reactive power direct control. The active and reactive power control may be used in a grid-tied charger composed of a PFC (Power Factor Correction) and bidirectional resonant DC/DC. In some embodiments the active and reactive power control controls the battery charging/discharging current. In some embodiments the active and reactive power control controls the shifting between PFC current and voltage. The active and reactive power control reduces computation burden and enhances harmonic content by current shaping in ABC frame where no transformation is used.

In some embodiments the active and reactive power control calculates the powers by averaging instantaneous powers. In some embodiments the active and reactive power control calculates instantaneous power from measured currents and voltage. It should be noted that active power is the product of current and voltage and reactive power is the product of current and 90°-shifted voltage.

The power calculation method according to the invention is valid for both three phase configuration and single phase configuration, and can more generally be adapted to any grid configuration. The calculating of the power is utilized for the controlling of the battery charging/discharging current and for the controlling of the shifting between PFC (power factor correction) current and voltage. In some embodiments both power control loops are decoupled, no transformation is used, and currents are shaped by inner current loops.

In an advantageous embodiment, for three-phase configuration, a controller is dedicated to each phase. The control loop output is the phase angle applied to the power factor corrector current reference.

Another object of the invention is the use of a method for controlling active and reactive powers according to the invention in a battery charger for electrical vehicles.

Still another object of the invention is a grid-tied converter configured for implementing a method for controlling active and reactive powers according to the invention.

DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure.

The figures illustrate various aspects of the methods according to the invention, and of devices implementing said methods.

FIGS. 1(a) to 1(c) illustrate certain aspects of direct active and reactive power control in ABC frame, in accordance with some exemplary embodiments of the invention.

FIG. 9 shows such a charger configured in the three-phase mode.

FIG. 10 show a charger similar to that of FIG. 9, configured in the four phase mode.

FIG. 11 shows an ID configuration and detection system of a charge similar to that of FIG. 10.

FIG. 12 is a general representation of a bidirectional resonant DC/DC converter that can be used to implement the method according to the invention.

FIG. 13 shows a PWM pattern driving a bidirectional resonant DC/DC converter that can be used to implement the method according to the invention.

Reference numbers with three digits are used in relation with FIGS. 9 to 12.

DESCRIPTION

Figures 1A, 1B, 1C:
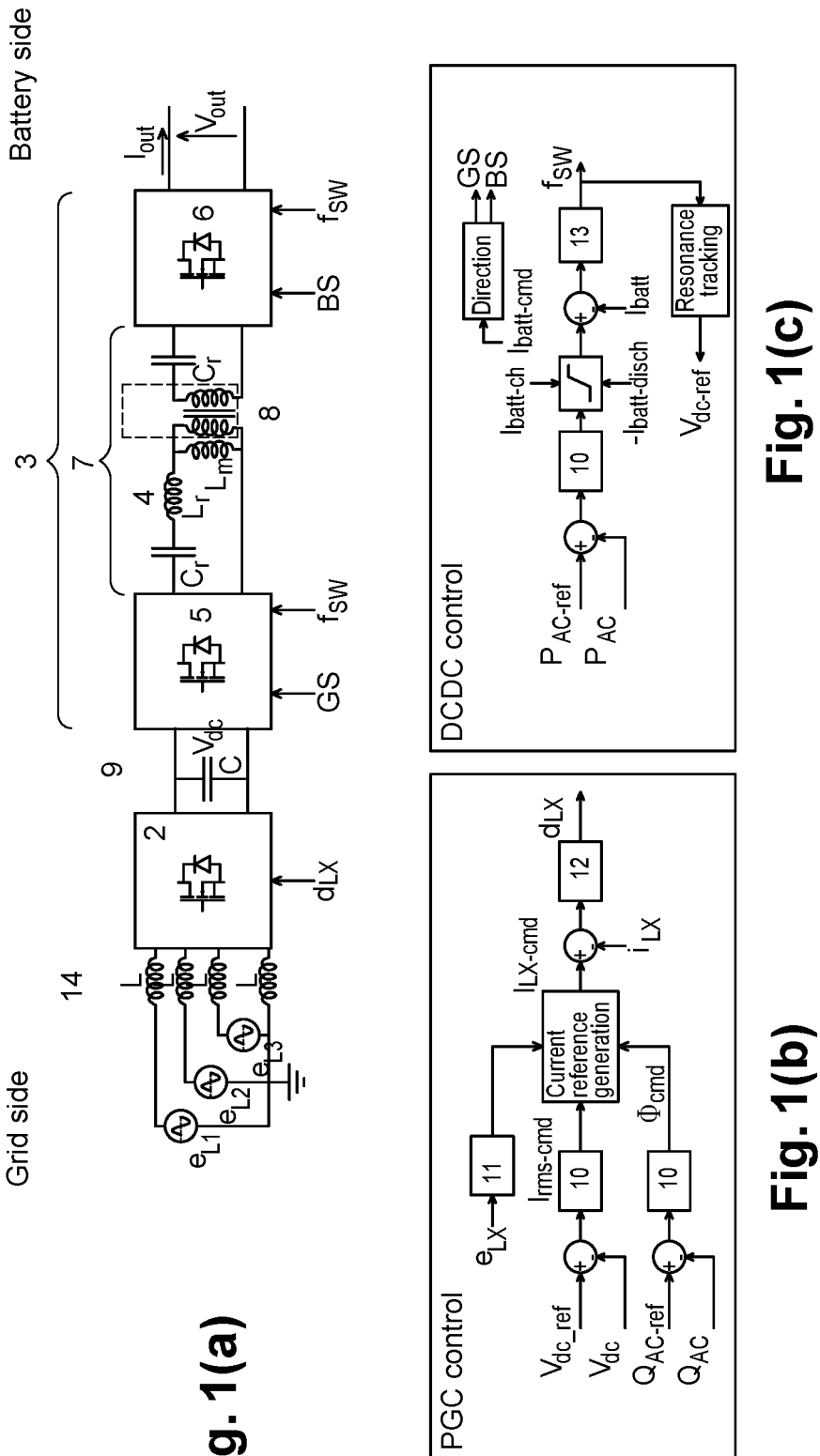

FIGS. 1(a) to 1(c) illustrate certain aspects of the direct power control in ABC frame according to the invention.

FIG. 1(a) is a simplified illustration of a battery charger 1 that can be used for charging the battery of electrical vehicles. FIGS. 1(b) and 1(c) relate to the direct power control in ABC frame for this charger: FIG. 1(b) illustrates the reactive lower loop, whereas FIG. 1(c) illustrates the active power loop.

The battery charger 1 comprises a grid side GS and a battery side BS, each of which has its specific connectors (not shown on the Figure). The grid side GS supplies an alternative current (AC) to the battery charger 1 whereas the battery side BS receives a direct current (DC) from the battery charger 1. In this example the grid side is a three phase grid, and the charger is adapted to uptake current from this three phase grid. It further comprises an AC/DC converter 2 and a DC/DC converter 3 linked by a DC link capacitor bus 9 (which can be a capacitance or a dedicated circuit). Said AC/DC converter 2 is a bidirectional four-leg bridge which cooperates with a boost inductance 14 for increasing the voltage. The AC/DC converter 2 has three further functions: grid current shaping, power factor control and DC bus voltage regulation.

Said DC/DC converter 3 is bidirectional, too, and its topology is based on a resonant CLLLC tank 7. More precisely, the DC/DC converter 3 has a grid-side bridge 5 and a battery-side bridge 6, which are separated by a resonant tank circuit 7 that includes a transformer 8 and a boost inductance 4 forming a resonant circuit; in this resonant circuit $C_r$ is the resonant capacitor, $L_r$ the resonant inductance, and $L_m$ the magnetizing inductance. In G2V mode, said battery-side bridge 6 ensures AC active power control and the regulation of the battery current $I_{out}$, and the DC/DC converter 3 is controlled by the commutation frequency $f_{SW}$, which is applied to the grid-side converter 5, and which can be varied. In V2G mode, the grid-side converter 5 ensures active power control, and the commutation frequency $f_{SW}$ is applied to said battery-side bridge 6.

In the reactive power loop (FIG. 1(b)), $V_{dc\_ref}$ is the reference voltage issued by the controller (not shown on the figure), $V_{dc}$ is the measured voltage of the capacitance C (visible on FIG. 1(a)), $Q_{AC\_ref}$ is the reference reactive power defined by the external user, and $Q_{AC}$ is the reactive power, calculated from the grid voltage and the grid current.

Table 1 summarizes the meaning of all abbreviations used in FIGS. 1(a) to 1(c) for physical parameters and signals.

TABLE 1

Abbreviations used in FIGS. 1(a) to 1(c)

| Designator | Description | Note |
|---|---|---|
| $e_{Lx}$ and $e_{Lx\text{-}cmd}$ | Grid voltage of phase x and command | x = 1, 2, 3, 4 |
| $I_{Lx}$ and $I_{Lx\text{-}cmd}$ | Grid current of phase x and command | x = 1, 2, 3, 4 |
| $P_{AC}$ and $P_{AC\text{-}ref}$ | Grid active power and reference power | User-defined reference |
| $Q_{AC}$ and $Q_{AC\text{-}ref}$ | Grid reactive power and reference power | User-defined reference |
| $V_{dc}$ and $V_{dc\text{-}ref}$ | DC-link voltage and reference voltage | Reference as parameter |
| $I_{rms\text{-}cmd}$ | Grid current RMS command | |
| $\varphi_{cmd}$ | Displacement power factor command | |
| $d_{Lx}$ | Duty cycle of phase x | x = 1, 2, 3, 4 |
| $V_{batt}$ and $V_{batt\text{-}ref}$ | Battery voltage and reference voltage | User-defined reference |
| $I_{batt}$ and $I_{batt\text{-}cmd}$ | Battery current and command current | |
| $I_{batt\text{-}ch}$ and $I_{batt\text{-}disch}$ | Battery charging and discharging current limits | User-defined limits |
| $e_{rms\text{-}ref}$ | Grid voltage RMS reference | Reference as parameter |
| $f_{grid\text{-}ref}$ | Grid frequency reference | Reference as parameter |
| $f_{sw}$ | Switching frequency | |
| GS and BS | Grid side and battery side activation signals | |

Reference number 10 designates a Proportional-integral (PI) controller, reference number 11 refers to a phase-locked loop (PLL), i.e. a control system that generates an output signal whose phase is related to the phase of an input signal. Reference number 12 refers to an AC current controller, reference number 13 to a battery current controller. PI controller 10 is operated as a linear controller, as explained below in relation with FIG. 6 and FIG. 5.

For sake of simplification FIG. 1(a) does not represent the filters before the AC/DC converter and behind the DC/DC converter.

The circuit shown on FIG. 1(a) is bidirectional, which means that the vehicle battery can be charged from the grid, or can supply current to the grid (so-called V2G mode).

The method according to the invention allows to control both active power (fed into the battery from the grid, or supplied by the battery to the grid), and reactive power (for grid stabilization and grid services). The reactive power is a phase shift between V (grid voltage) and I (current); reactive power is used to stabilize the grid voltage by injecting or absorbing the reactive power. This is considered as known and is not part of the invention. The present invention is directed to a novel technique for controlling of the injection or the absorption of this reactive power. The inventors have found that this method leads to a better stabilization of the system in case of perturbation, such as varying load or grid fluctuations.

Figure 2:
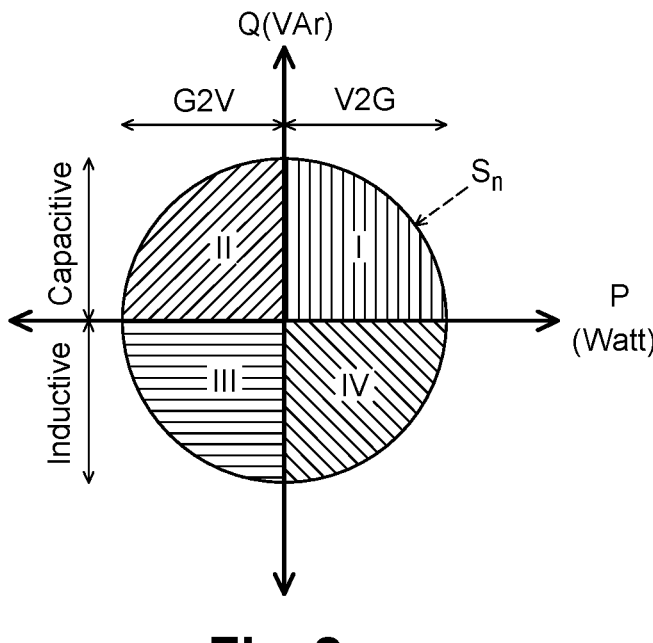
FIG. 2 illustrates the active and reactive power quadrants.

The proposed control method operates in four-quadrant frame, as shown in FIG. 2, and uses all sign combinations of P&Q.

We will now describe the reactive power control for a four-leg PFC. Based on the system (four-leg PFC) differential equations, an average model is established using large signals approach. The developed model serves to derive the different control loops and to study their stability. For such purpose, consider the control topology illustrated in FIG. 3, which also identifies the signals. This circuit comprises the AC/DC converter 2 and boost inductance 14. The AC/DC converter controls the reactive power by controlling the phase angle between the grid voltage and current whereas the DC/DC converter controls the grid side active power by controlling the power flow from/to AC/DC converter DC link bus to/from the battery. The AC/DC converter 2 and the DC/DC converter 2 are linked together by the DC link bus 9.

Figure 3:
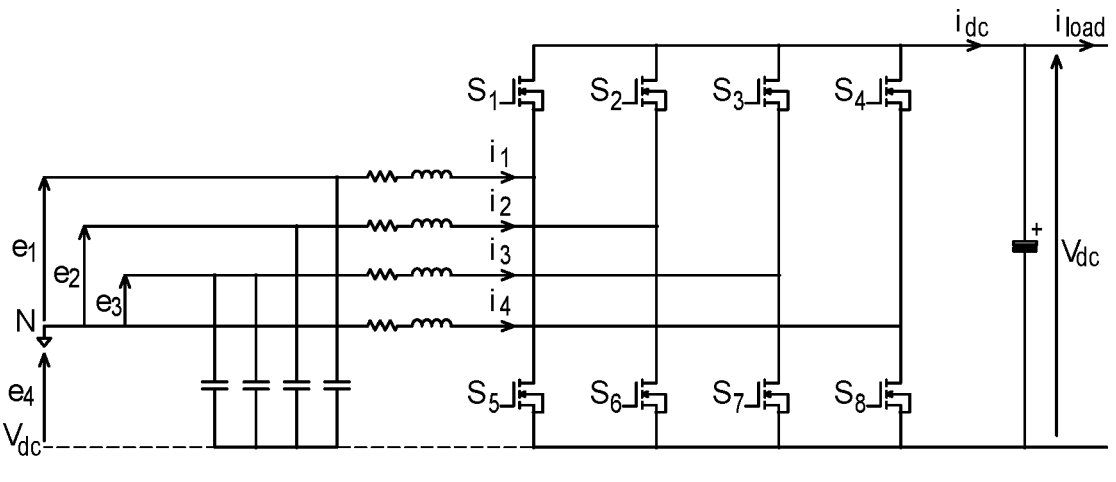
FIG. 3 shows a power factor correction topology that can be used for implementing the method according to the invention.

The following parameters are used on FIG. 3 and/or in the model:

e1, e2, e3 and e4 are respectively the voltages of phases L1, L2, L3 and L4.

i1, i2, i3 and i4 are respectively the currents of phases L1, L2, L3 and L4.

N is the neutral point.

Vdc is the DC link bus voltage.

Idc is the DC link bus current.

Vdc is the sensing reference potential.

$I_{load}$ is the load current.

Sj, j=1, . . . 8 designates the switch state: Sj=0 designates an open switch, Sj=1 a closed switch.

The reactive power is controlled by the angle $\phi$ that represents the phase shift between grid voltage and current. It is the second outer loop with the DC-link bus voltage loop. The angle $\varphi_{cmd}$ (pond is used by the current loop to generate the grid current reference.

Figure 6:
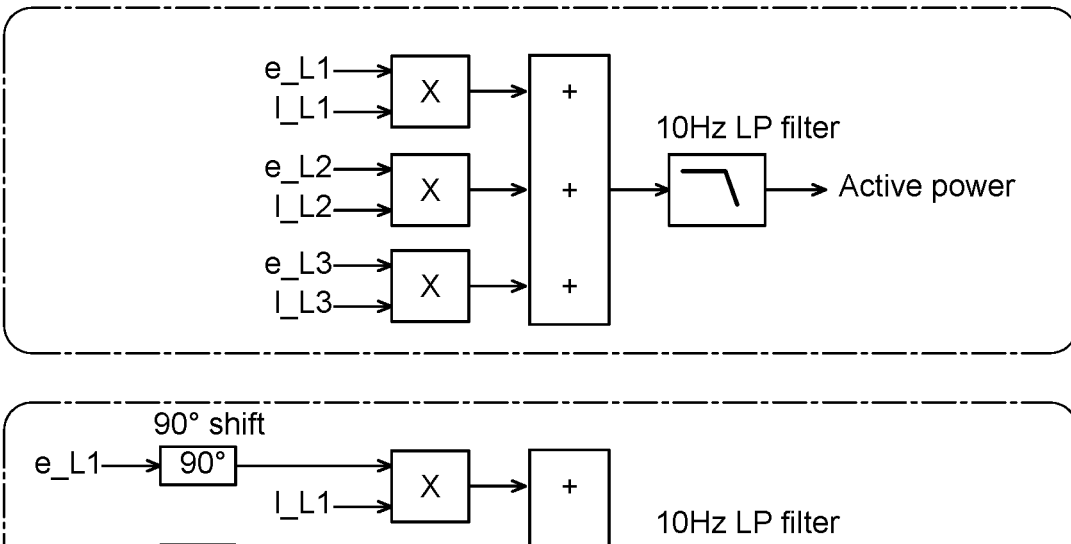
FIG. 6 illustrates the calculation of active and reactive power as the product of grid voltages and grid currents.

FIG. 6 illustrates the calculation approach of active and reactive powers used in the present invention. The reactive power is calculated from the product of instantaneous phase current and 90° shifted phase voltage and then filtered to obtain average value.

Based on this approach, the reactive power of one single phase can be written as:

$$Q = \sqrt{2}\,E_{rms} \sin\left(\omega t + \frac{\pi}{2}\right)\sqrt{2}\,I_{rms}\sin\left(\omega t + \varphi\right) \qquad \text{(Equation 1)}$$

where $E_{rms}$ and $I_{rms}$ are RMS values of phase voltage and current. $\omega$ is the grid pulsation.

Using the common product of two sine waves $$\left(\sin A \sin B = \frac{\cos(A-B) - \cos(A+B)}{2}\right),$$

we obtain $$Q = E_{rms}I_{rms} \cos\left(\frac{\pi}{2} - \varphi\right) - \cos\left(2\omega t + \frac{\pi}{2} + \varphi\right) \qquad \text{(Equation 2)}$$

We know that $$\cos\left(\frac{\pi}{2} - \varphi\right) = \sin(\varphi).$$

Figure 5:
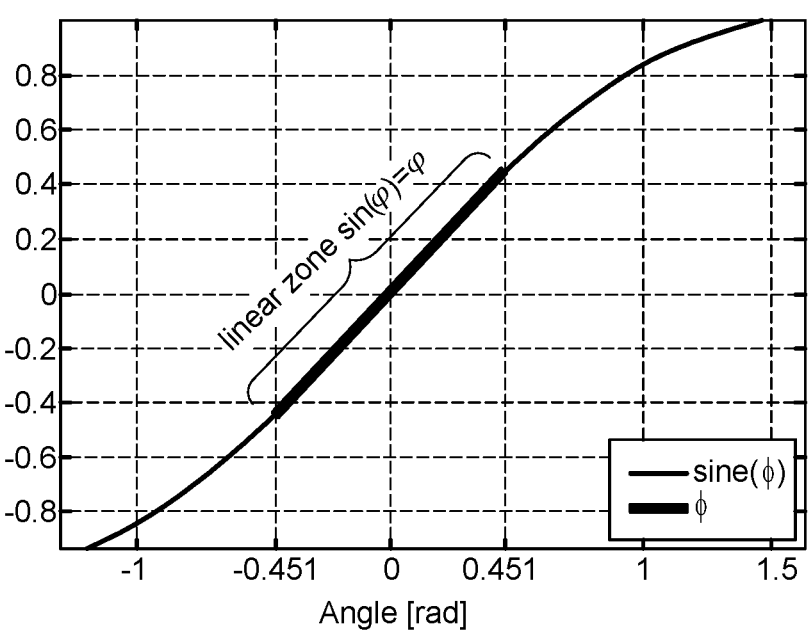
FIG. 5 shows linearization of sin φ.

As illustrated in FIG. 5, we can consider the approximation $\sin(\varphi) = \varphi$. As can be seen from FIG. 5, this approximation is valid in the small phase-shift angle domain defined by +/−0.451 rad (corresponding to a phase angle of +/−26°).

In addition, the term $$\cos\left(2\omega t + \frac{\pi}{2} + \varphi\right)$$

has a pulsation equal to the double of the grid pulsation (100/120 Hz).

In three-phase grid, this double-line frequency pulsation is null for the sum of the three phases. However, in single-phase or two-phase, it must be suppressed by a low pass filter and that leads to an averaged value of the reactive power. To use the same controller for all grid configurations, a low pass filter is applied on the sum of all phases reactive power. This filter must be considered for the control loop design. The control is designed for single-phase case and applied for other cases as three-phase and bi-phase (split phase).

Then, we can write in single-phase:

$$Q = E_{rms}I_{rms} \frac{1}{\tau s + 1} \varphi_{cmd} \qquad \text{(Equation 3)}$$

wherein τ is the low pass filter time constant.
The transfer function is $$G(s) = \frac{K}{\tau s + 1} \qquad \text{(Equation 4)}$$

with $K = E_{rms}I_{rms}$.

The transfer function is a first order system. It can be controlled by a PI controller that must be designed for the worst case of K which is the maximum apparent power value for single-phase (K=16×230=3680 VA).

Open loop transfer function is given by $$G_{OL}(s) = \frac{(K_p s + K_i)}{s} \frac{K}{\tau s + 1} \qquad \text{(Equation 5)}$$

Using pole placement approach, controller parameters can be selected as $$K_p = \alpha \frac{\tau}{K} \text{ and } K_i = \alpha \frac{1}{K}$$

where α is a design parameter selected at least 20 times below the sampling frequency $f_{sc}=1$ kHz. The low pass filter frequency is set to 10 Hz then τ=0.016.

The filtering frequency must be higher than the closed loop crossing frequency. Then, α must respect the conditions $\alpha < 2 \times \pi \times 10$ Hz which is lower than 20 times the sampling frequency.

Let us set $\alpha = 2 \times \pi \times 5$ Hz.

It results that $$K_p = 0.00013 \text{ and } K_i = 0.0083$$

Figure 4:
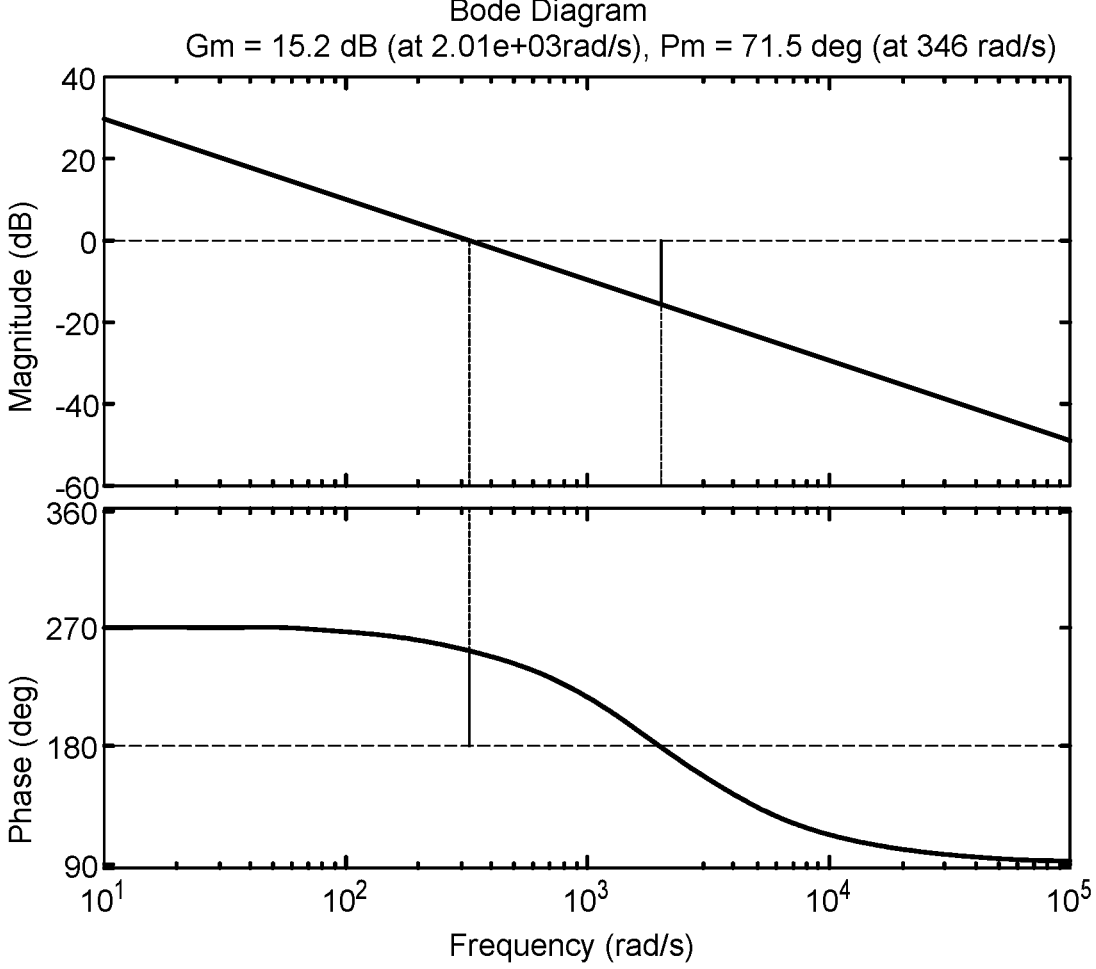
FIG. 4 shows a reactive power loop Bode plot.

Based on the obtained parameters and digitization numerical delay T of 1.5/1000=1.5 ms (due to 1 KHz sampling frequency), closed loop stability margins are determined by Bode plot in FIG. 4. Gain margin is 15.2 dB and phase margin is 71.5°. The obtained values are higher than the usually desired margins (10 dB and 60°).

We will now describe the active power control for this four-leg PFC. The instantaneous active power for a single-phase is given by $$P = \sqrt{2}E_{rms} \sin(\omega t)\sqrt{2}I_{rms} \sin(\omega t + \varphi) \qquad \text{(Equation 6)}$$

where φ is grid current angle.

Using the common product of two sine waves $$\left(\sin A \sin B = \frac{\cos(A-B) - \cos(A+B)}{2}\right),$$

we obtain $$P = E_{rms}I_{rms} \cos(-\varphi) - \cos(2\omega t + \varphi) \qquad \text{(Equation 7)}$$

The first term represents the average active power. The second term is undesired. Fortunately, is null in three-phase grid. However, it must be filtered for single-phase. Then, low pass filter will be used in the control loop for all cases.

As illustrated schematically on FIG. 6 and considering that all active power is consumed by the DC/DC converter load, one can write:

$$P = V_{batt}I_{batt} \qquad \text{(Equation 8)}$$

The efficiency term is omitted for simplicity.

By filtering the double pulsation term with a first order low pass filter (10 Hz cut frequency)

$$P_{avg}(s) = \frac{1}{\tau s + 1} P(s) \qquad \text{(Equation 9)}$$

$P_{avg}$ is the average power to be controlled and τ is the low-pass filter time constant.

Then, the transfer function of average active power to battery current is $$\frac{P_{avg}(s)}{I_{batt}(s)} = \frac{K}{\tau s + 1} \qquad \text{(Equation 10)}$$

with $K = V_{batt}$.

$V_{batt}$ impact can be removed by feedforward or by considering the nominal case ($V_{batt}$=350V).

Controller parameters design: Open loop transfer function is given by $$G_{OL}(s) = \frac{K(K_p s + K_i)}{s(\tau s + 1)} \qquad \text{(Equation 11)}$$

Using pole placement approach, controller parameters can be selected as $$K_p = \alpha \frac{\tau}{K} \text{ and } K_i = \alpha \frac{1}{K}$$

where $\alpha$ is a design parameter selected at least 20 times below the sampling frequency ffc (ffc=7 kHz, slow ISR sampling frequency). However, this is not enough in this case because the dominant dynamic is the filter's dynamic, the parameter $\alpha$ must be at least 2 times lower than the filter frequency. Then, it can be chosen as $$\alpha = 2\pi \frac{10}{2} = 31.4 \text{ rad/sec.}$$

It results that $$K_p = 0.0014 \text{ and } K_i = 0.09$$

Stability Analysis

Based on the obtained parameters, closed loop stability margins are determined by a Bode plot of the open loop transfer function $$G_{OL}(s) = \frac{(K_p s + K_i)}{s} \frac{K}{\tau s + 1} \times \frac{\left(1 - \frac{T}{2}s\right)}{\left(1 + \frac{T}{2}s\right)} \qquad \text{(Equation 12)}$$

where $T=1.5 \times T_s$ with T a numerical delay and $T_s$ the sampling period ($T_s$32 1/Fs_fc).

$$P = \sqrt{2}E_{rms} \sin(\omega T)\sqrt{2}I_{rms} \sin(\omega + \varphi) \qquad \text{(Equation 13)}$$

where $\varphi$ is the grid current angle.

Figure 7:
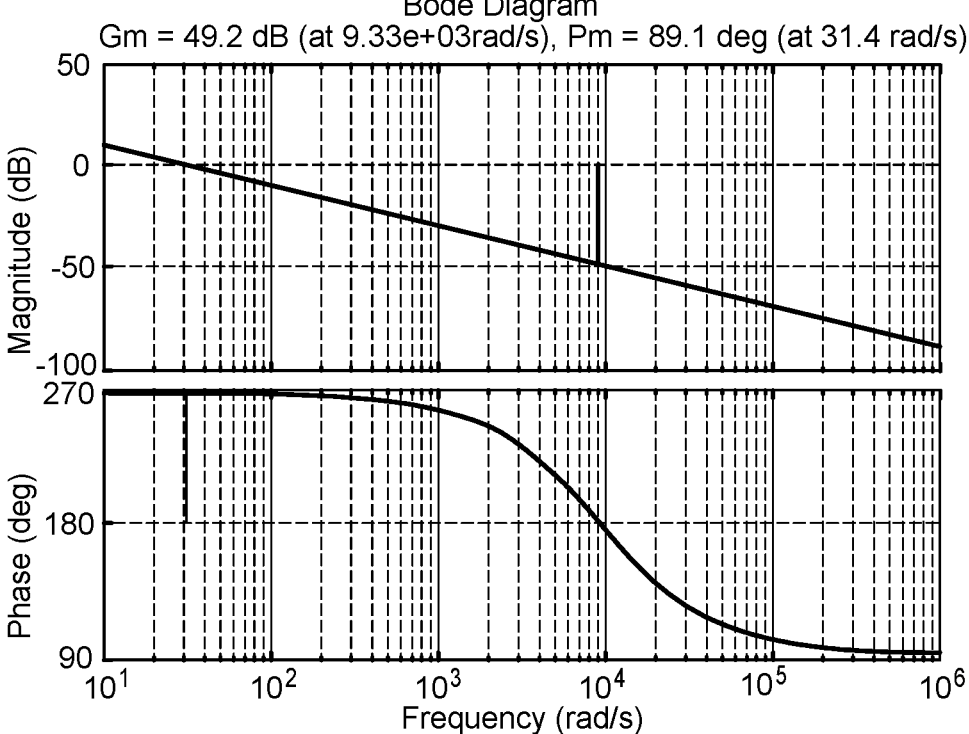
FIG. 7 shows an active power loop Bode plot.

In the example, based on the obtained parameters and digitization numerical delay T of 1.5/7000=214 us (due to 7 KHz sampling frequency), closed loop stability margins are determined by Bode plot in FIG. 7. Gain margin is 49.6 dB and phase margin is 89.1°. The obtained values are higher than the usually desired margins (10 dB and 60°).

Figure 8:
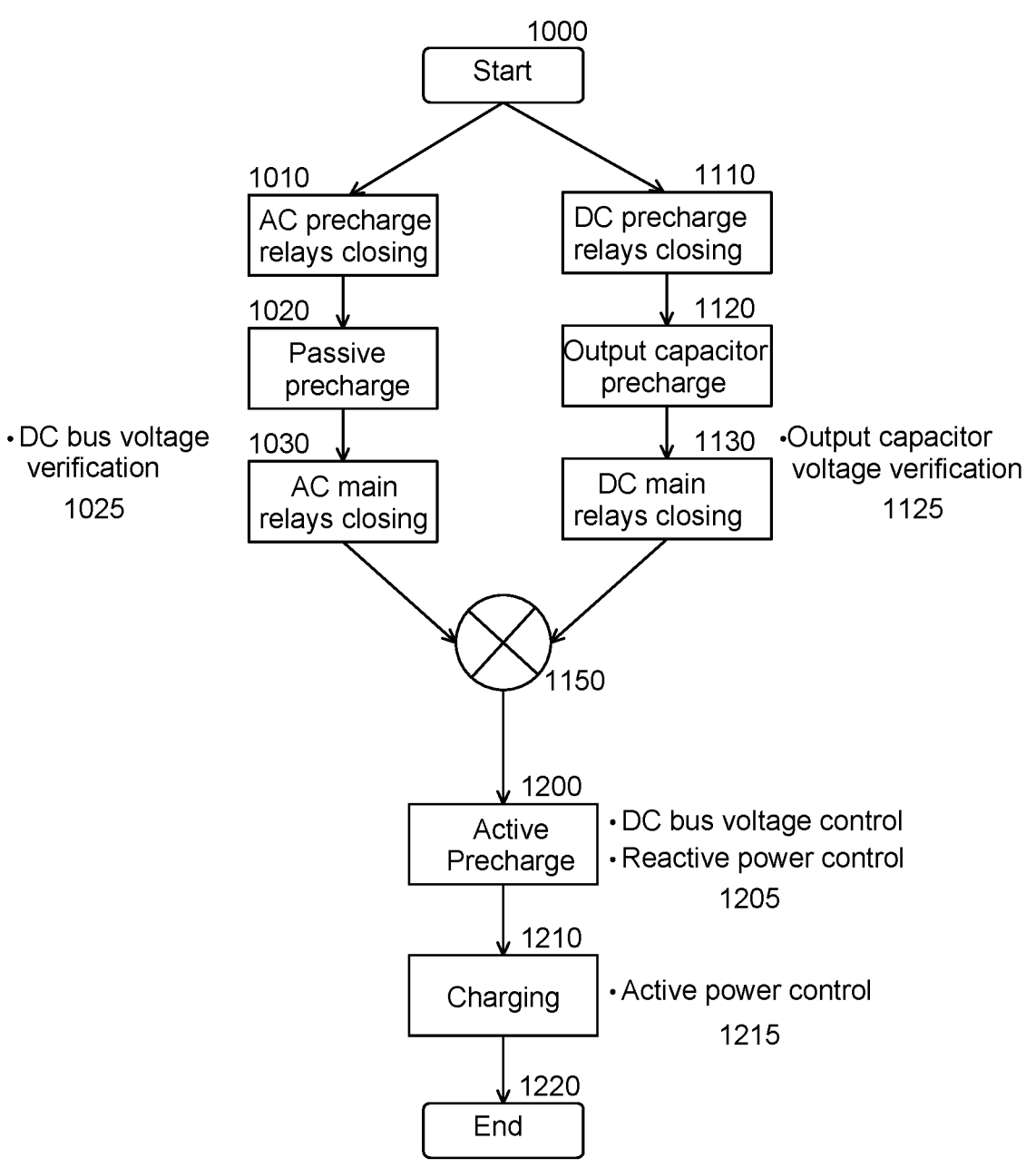
FIG. 8 shows the successive steps of an embodiment of the method according to the invention. Reference numbers with four digits are used on FIG. 8; they refer to process steps.

We will now describe in relation with FIG. 8 a method according to the invention to control active and reactive power in a grid-tied converter.

The process is started at step 1000 by a request sent by the user charge to the converter with active/reactive power targets and charging/discharging current limits.

At step 1010 the AC precharge relays are closed to charge DC link bus (passive precharge, step 1020). At step 1110 the DC precharge relays are closed to charge the output capacitor (step 1120).

At step 1125 the output capacitor voltage is verified. When the output capacitor voltage is about +/−5V or battery voltage, the DC main relay is closed at step 1130, otherwise output capacitor precharge will continue at step 1120 until the condition is fulfilled at step 1125.

At step 1025 the DC bus voltage is verified. When the DC link bus voltage is higher than $\sqrt{6} \times$Un (where Un is the max grid phase rms voltage), then the AC main relays are closed at step 1030, otherwise the passive precharge of the DC bus will continue at step 1020 until the condition is fulfilled at step 1025.

At step 1200 active precharge is started. At step 1205, reactive power control starts and DC bus voltage control is carried out. PWMs order are sent to AC/DC (PFC) to actively precharge the DC bus voltage up to $2\sqrt{2}$Un (step 1210).

Active and reactive power control is carried out in step 1215. Reactive power is also controlled by the AC/DC with 0 VAR as target. After a delay of 0.5 seconds, PWMs orders are sent to DCDC to control active power. Reactive power is allowed at this stage to follow non zero targets.

DCDC control is started in burst mode until the burst Off time reaches its minimum value. Then, the DCDC control is switched to frequency based control.

Resonance tracking loop is activated in frequency based control to generate the DC bus link voltage reference (between $2\sqrt{2}U_n$ and 850V) in order to force the DCDC to switch at the resonance frequency (80 kHz+/−10%) as much as possible.

We will now describe in more detail in relation with FIGS. 9 to 13 grid-tied converters that are capable of implementing the method according to the invention. As mentioned above, the method for active and reactive power control according to the invention can be used with grid-tied converters operating in single-phase mode or in three phase mode. In this respect, it would be desirable that the converter be able to automatically identify the grid configuration as being a single phase or a three phase configuration, and be able to automatically adapt the configuration of the to the grid-tied converter to this identified grid configuration. We will describe here an embodiment which is capable of carrying out these two functions of identification of the grid configuration and of switching the converter into the right configuration.

Figure 9:
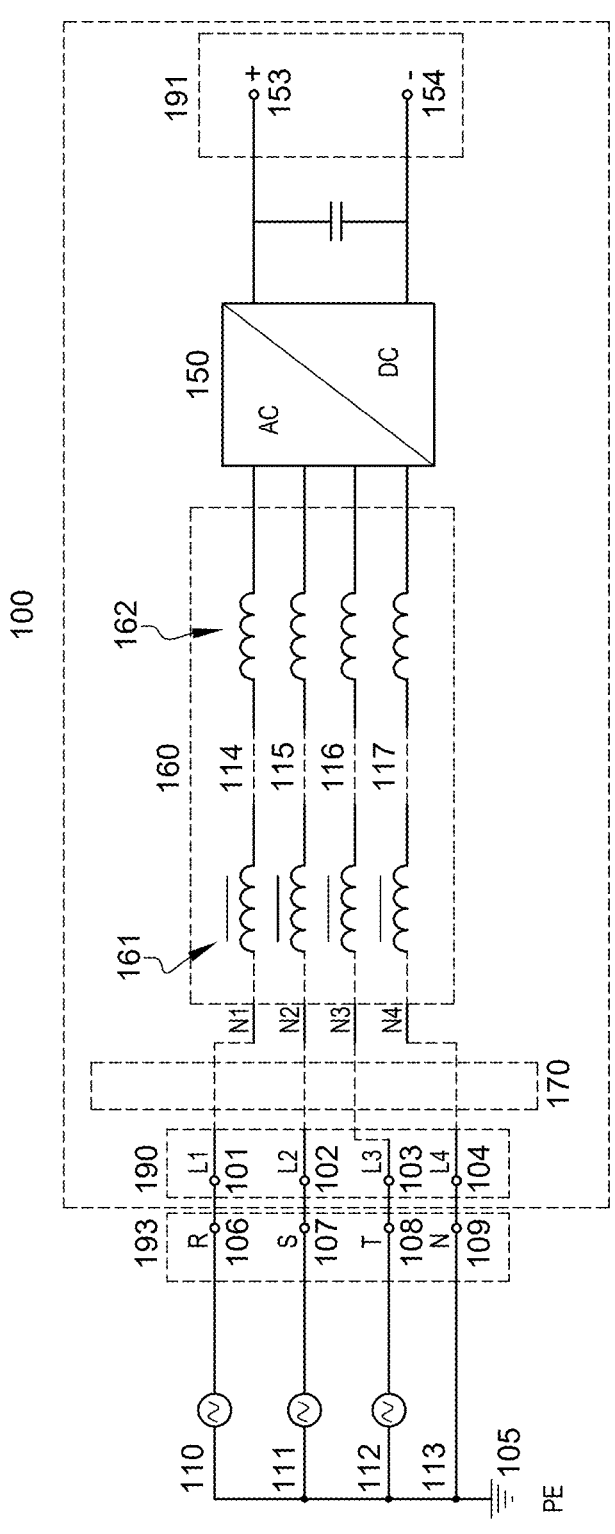
FIGS. 9 to 13 show different aspects of a universal and versatile charger for electric batteries of an electrical vehicle, in accordance with some exemplary embodiments of the invention, that can implement the method according to the invention.

FIG. 9 shows the universal battery charger 100 according to the invention, configured as a charger in a three-phase mode used to charge the battery of an electrical vehicle. This converter or charger is called here a «universal» converter or charger, because it can adapt itself to different grid configurations; this self-adaptation to a given grid configuration is also referred to as an "automatic selection" of the configuration. This automatic selection is based on grid side phase voltage and grid side phase angle measurement, which allows the determination of the number of the connected phases. The configuration is then selected upon this number of connected phases.

Grid-tied converter 100 (called her also «battery charger» or «charger») comprises four current lines referenced here as N1,N2,N3,N4. It comprises a first set of electrical connectors 101,102,103,104, intended to be connected to the grid, and a second set of electrical connectors 153,154 intended to be connected to the battery of an electric vehicle.

Charger 100 further comprises an AC/DC converter 150, and for each current line N1,N2,N3,N4 a set of filters 160, said set of filters typically comprising a common mode filter 161 (which can be an inductance with a magnetic core) and a differential inductance 162. Such a set of filters is known as such, and the same applies to the AC/DC converter 150. Said AC/DC converter 150 typically uses fast power switching devices such as SiC MOSFETs, operating at high voltage as mentioned above, with a switching time of the order of 10 ns. These fast power switching devices carry current in the order of 10 A to 25 A.

Typically, all connectors of the first set of connectors form a first connector unit 190, and/or all connectors of the second set of connectors form a second connector unit 191. Said first connector unit 190 comprises connectors 101, 102, 103, 104 labelled here respectively as L1, L2, L3 and L4. In the three-phase operation shown in FIG. 9, L1 connector 101 of charger 100 is connected to R connector 106 of the grid; L2 connector 102 is connected to S connector 107; L3 connector 103 is connected to T connector 108, and L4 connector 104 is connected to N connector 109, and said connectors L1, L2, L3 and L4 are intended to be connected to grid connectors R 106, S 107, T 108 and N 109, N being the neutral. Said grid connector R 106 is connected to grid line 110, and said grid connectors S 107 is connected to grid line 111, and said grid connector T 108 is connected to grid line 112. Said grid line N 109 is the neutral 113 of the grid, which can be connected to protective earth PE 105.

As can be seen on FIG. 9, in the three-phase operation when the charger is connected to the grid: Grid line 110 is connected to R connector 106 which connected to L1 connector 101. Said L1 connector 101 is connected to current line N1 via a switch (not shown in the figure); said current line N1 is connected to filter line 114 which is connected to said AC/DC converter 150. Grid line 111 is connected to S connector 107 which is connected to L2 connector 102. Said L2 connector 102 is connected to current line N2 via a switch (not shown in the figure); said current line N2 is connected to filter line 115 which is connected to said AC/DC converter 150. Grid line 112 is connected to T connector 108 which is connected to L3 connector 103. Said L3 connector 103 is connected to current line N3 via a switch (not shown in the figure); said current line N3 is connected to filter line 116 which is connected to said AC/DC converter 150. Grid connector 109 is connected via grid line 113 to protective earth 105, and is connected to L4 connector 104 which is connected to current line N4 via a switch (not shown in the figure); said current line N4 is connected to filter line 117 which is connected to AC/DC converter 150. Each of said filter lines 114,115,116, 117 runs through each of the filters 161,162 of the set of filters 160. Said four switches (not shown on the figures) form part of the ID detection and reconfiguration system 170 (also called «configurator»).

The AC/DC converter 150 is connected to the battery (not shown in the figures) via connector 153 and connector 154.

Typically all grid connectors R,S,T,N form part of a connector unit, referenced here as to the «third» connector unit 193. Said third connector unit 193 is typically provided by the operator of the charging station. Said first connector unit 190 is designed to be connected, directly or via a suitable adapter unit (not shown on the figures), to said third connector unit 193.

According to an advantageous embodiment the three-phase state configuration described herein is set by a configurator 170 (the structure of which is not shown in this figure) using said set of switches. It should be noted that in this figure, as in all other figures of this description, dotted current lines indicate the optional presence of additional components.

The universal and versatile charger 100 for electric battery shown in FIG. 9 can be configured differently by means of configurator 170 (the structure of which will be explained below) using a set of switches; as an example, the three-phase mode can be switched to the single-phase mode, and vice versa.

Figure 10:
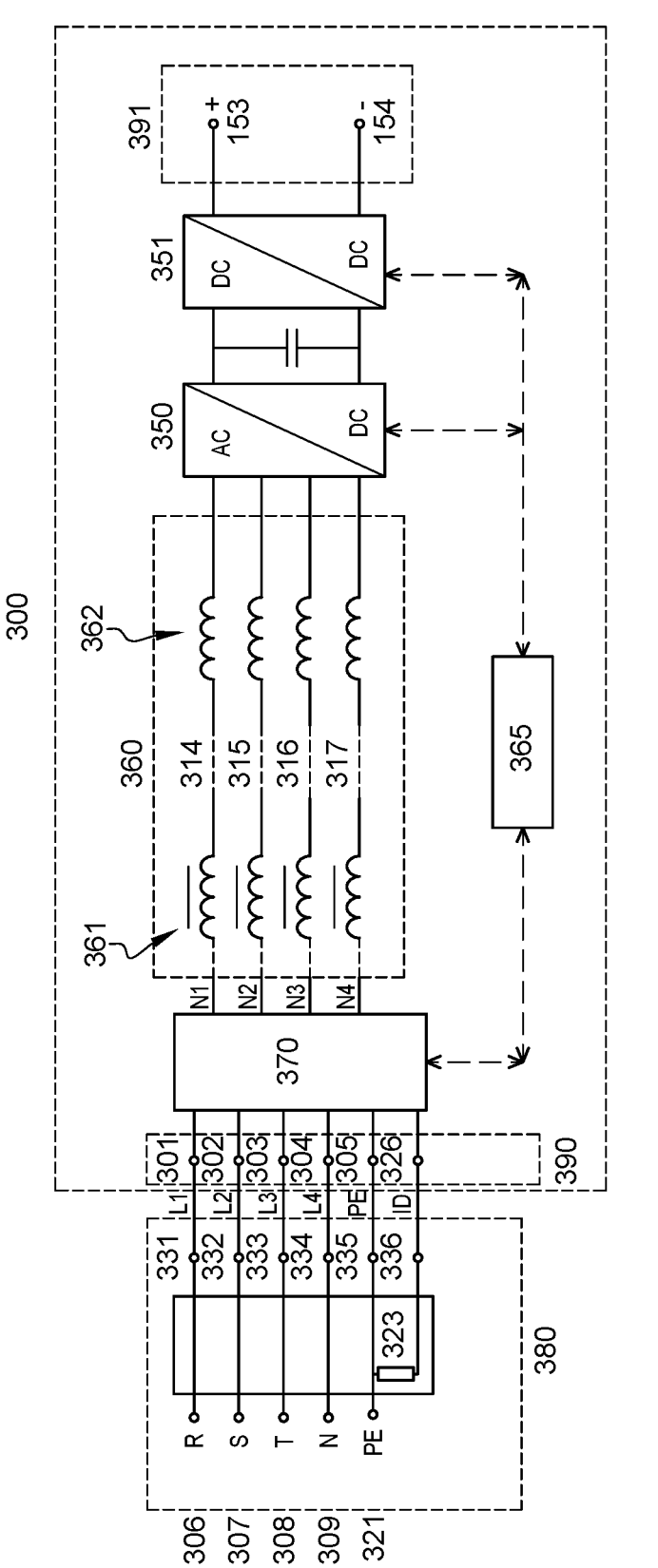

FIG. 10 shows the universal and versatile charger 300 for electric battery in accordance to another exemplary embodiment of the present invention. All reference numbers of features that are common with those in FIG. 9 have been increased by 200. The charger operates here in a four-phase configuration. In this embodiment the first connector unit 390 has a different structure from the one depicted on FIG. 9. Furthermore, the charger 300 is provided with a DC/DC converter 351 in addition to the AC/DC converter 350.

The first connector unit 390 comprises six connectors, five of which are intended to be connected to grid connectors when the device 300 is used as a charger in four-phase operation mode. The peculiar feature of this embodiment (which is compatible with all embodiments of the present invention) is the presence of a signal line ID, which will be explained below. An adapter unit 380 is used for connecting the first connector unit 390 to the grid; the third connector unit with grid connectors is not shown on this figure.

Each connector 301,302,303,304,305,326 of the first connector unit 390 has a corresponding connector 331,332,333, 334,335,336 on the charger-side of the adapter 380: the L1 connector 301 matches connector 331, L2 connector 302 matches connector 332, L3 connector 303 matches connector 333, L4 connector 304 matches connector 334, PE connector 305 matches connector 335, and ID connector 326 matches connector 336. The grid side of adapter 380 has corresponding connectors: L1 connector 331 is connected to grid line R 306, L2 connector 332 is connected to grid line S 307, L3 connector 333 is connected to grid line T 308, L4 connector 334 is connected to grid line N 309, PE connector 335 is connected to the protective earth PE 321.

The configuration of the charger 300 is set by switches comprised in the configurator 370. Said configurator 370 is controlled by a digital signal processor (DSP) 365 which includes a microprocessor. Said DSP 365 also receives data from the configurator 370 and from the AC/DC converter 350 and/or the DC/DC converter 351. This bidirectional communication link for digital data transfer is symbolized on FIG. 10 by dotted lines with arrows.

The DSP 365 senses the voltage signal ID derived from the protective earth PE via resistance 323, and is configured to recognize the configuration of the grid when the charger is connected to the grid. It will then configure the configurator 370 accordingly, by sending appropriate instructions to the switches of the configurator 390. Furthermore, the DSP 365 is configured such that when the user selects the vehicle-to-load (V2L) mode, the DSP 365 will instruct the configurator 370 to configure the circuits accordingly, using switches; this will be described below in relation with FIG. 10. External resistance 323 can be incorporated in the AC cable or in the adapter, or added externally by the user.

The ID detection and reconfiguration unit 370 automatically recognizes the grid configuration (such as: four-phase, three-phase with/without neutral, bi-phase, single-phase). It also allows to set the charger to a V2L configuration. This will be explained in greater details in relation with FIG. 11.

Figure 11:
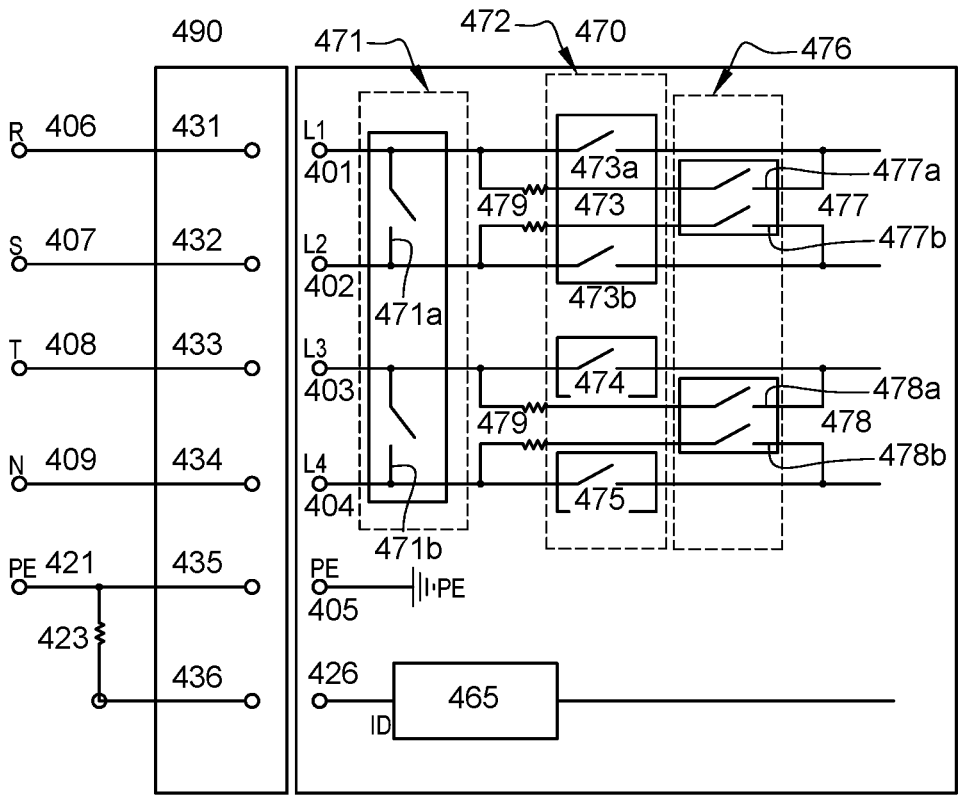

FIG. 11 shows a detailed view of the ID detection and reconfiguration 370,470 of a universal charger 300 for electric battery in accordance to another exemplary embodiment of the present invention. All reference numbers of features that are common with those in FIG. 9 have been increased by 200 or 300. The charger operates here in a four-phase configuration. In this embodiment the first connector unit 390 has a different structure from the one depicted on FIG. 9. Furthermore, the charger 300 is provided with a DC/DC converter 351 in addition to the AC/DC converter 350.

The configurator 470 comprises a first switching unit 471, a second switching unit 472, and a third switching unit 476. The switches of each of these switching units can advantageously be formed by two independent relays (preferably so-called 1Form A relays with a default state of normally open) operated simultaneously, or by one single relay of the 2Form A type (this terminology being known to a person skilled in the art of electrical engineering).

Said first switching unit 471 comprises two switches 471a,471b. They are closed in case of charging in single-phase mode; this allows to charge up to two third of the nominal three-phase mode power, thereby allowing the reduction of the charging time by half compared to the state of the art. In other operating modes switches 471a,471b are open.

Said third switching unit 476 is optional. It comprises two switching subunits 477,478, each of which comprises two switches 477a,477b;478a,478b. These switching subunits 477,478 are pre-charge relays used for passive precharge of the DC bus capacitors. Once the precharge is done, these relays can be opened.

Said second switching unit 472 comprises three switching subunits 473,474,475. The first 473 and second 474 switching subunits are main AC relays. They are closed in case of charging in the single-phase or three-phase mode once the pre-charge is over. The first switching unit 473 comprises two switches 473a;473b. The third switching subunit 475 is only closed in single-phase mode charging or in the case of three-phase mode charging with neutral. However, it is preferred that in case of unbalanced three-phase systems with neutral, when the charger is connected to the AC grid, switch 475 be opened to force the homopolar (or zero sequence) current to zero.

Resistors 479 between the first 471 and second 472 switching unit are so-called «precharge resistors», known as such. Their function is to precharge the capacitive elements, in order to avoid a peak of inrush current; such a peak inrush current could be capable of damaging switches, input capacitors, fuses and battery cells.

The connectors L1 401, L2 402, L3 403, L4 404, PE 405 as well as the connector for the ID cable 426 are configured to be connectable to a six pins AC connector 490. Said AC connector 490 allows to connect:

the L1 connector 401 via current line 431 to the R connector 406 of the grid,
  the L2 connector 402 via current line 432 to the S connector 407 of the grid,
  the L3 connector 403 via current line 433 to the T connector 408 of the grid,
  the L4 connector 404 via current line 434 to the N connector 409 of the grid,
  the PE connector 405 via current line 435 to the protective earth 421 of the grid.

The ID connector 426 is connected via current line 436 in series to an external resistance 423 that connects in parallel with the protective earth 421 of the grid. The manufacturer of the charger specifies to the user the value of the external resistance 423 to be added for each operation mode.

Figure 12:
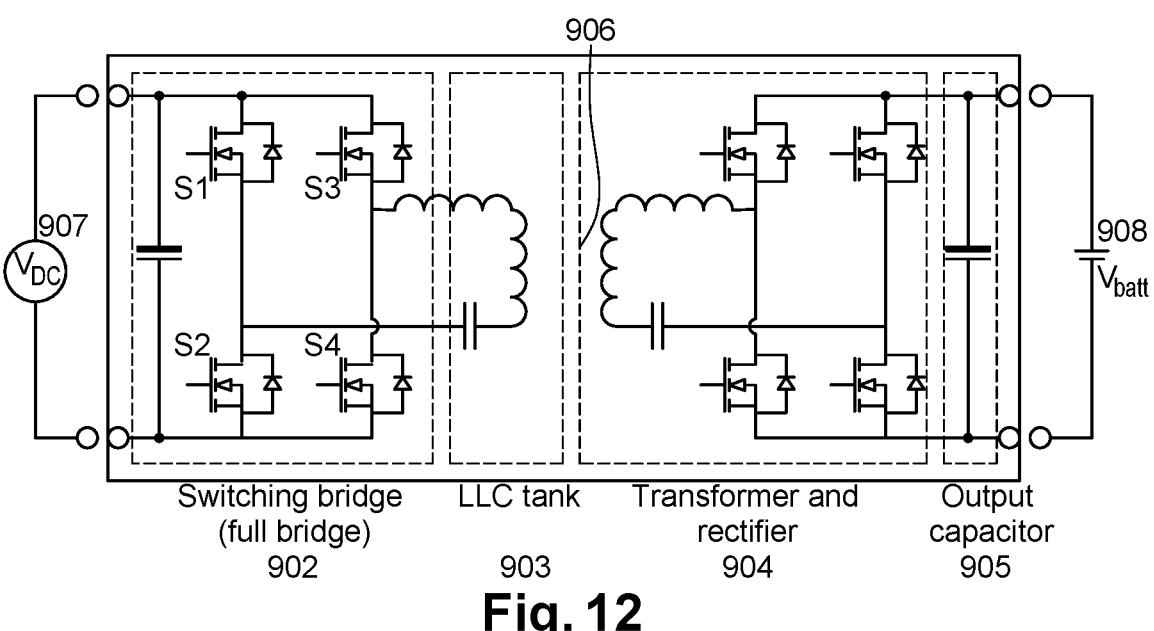

FIG. 12 shows the DC/DC converter that is advantageously used in a grid tied converter (battery charger) capable of implementing the method according to the present invention. The DC/DC converter controls the active power on the grid side by drawing (charging) or injecting (discharging) current from/to the input DC voltage 907 to/from the battery. The AC/DC converter is connected to the DC/DC converter via the input DC voltage capacitor which represents the DC link bus. Said DC/DC converter is a resonant converter comprising a full bridge converting stage, a CLLLC resonant tank and output rectifier stage. More precisely, this circuit comprises a switching bridge (full bridge) 902 coupled to a CLLLC resonant tank 903, a transformer and rectifier 904, and an output capacitor 905. Said full-bridge comprises two pairs of power switches S1/S2 and S3/S4 on the primary side of the transformer 906. A charger comprising such a bidirectional resonant DC/DC converter can be used for electrical vehicles, and in such a charger, the input DC voltage 907 is typically of the order of 650 V to 850 V and the output voltage 908 is typically of the order of 250 to 450 V.

In an advantageous embodiment, the AC/DC converter controls the input DC voltage 907 by keeping it between 650 V and 850 V. Then, the DC/DC converter transfers the power absorbed/injected by the AC/DC converter to/from the battery side by controlling the frequency of the pulse-width modulation (PWM) signal of the switching bridge. In charging operation (absorption), the switching bridge 902 is the full bridge on the input side, and the full bridge on the output side (battery side) works as a rectifier. The power flows from the input to the output. In discharging mode, the AC/DC converter injects power to the grid and discharges the input DC voltage capacitor. To maintain the input DC voltage between 650 V and 850 V, the DC/DC converter injects power from the battery into the input DC 907. The full bridge 904 becomes a switching bridge controlled by varying the frequency of the pulse-width modulation (PWM) signal and the full bridge 902 works as a rectifier.

In an advantageous embodiment, the DC/DC converter is configured such that in a first mode of operation pulse-width modulation (PWM) in the burst mode with phase-shift is used for each of the four switches S1, S2, S3 and S4. More precisely, switches S1 and S4 are driven by the same two pulse pattern with a phase shift $\beta 1$, said two pulse pattern comprising a first pulse P1 of width t1 and a second pulse P2 of width t2, P1 and P2 being separated by an off-time t3; switches S2 and S3 are driven by the same single pulse pattern comprising pulse P4 of width t4 with a phase shift $\beta 2$.

Figure 13:
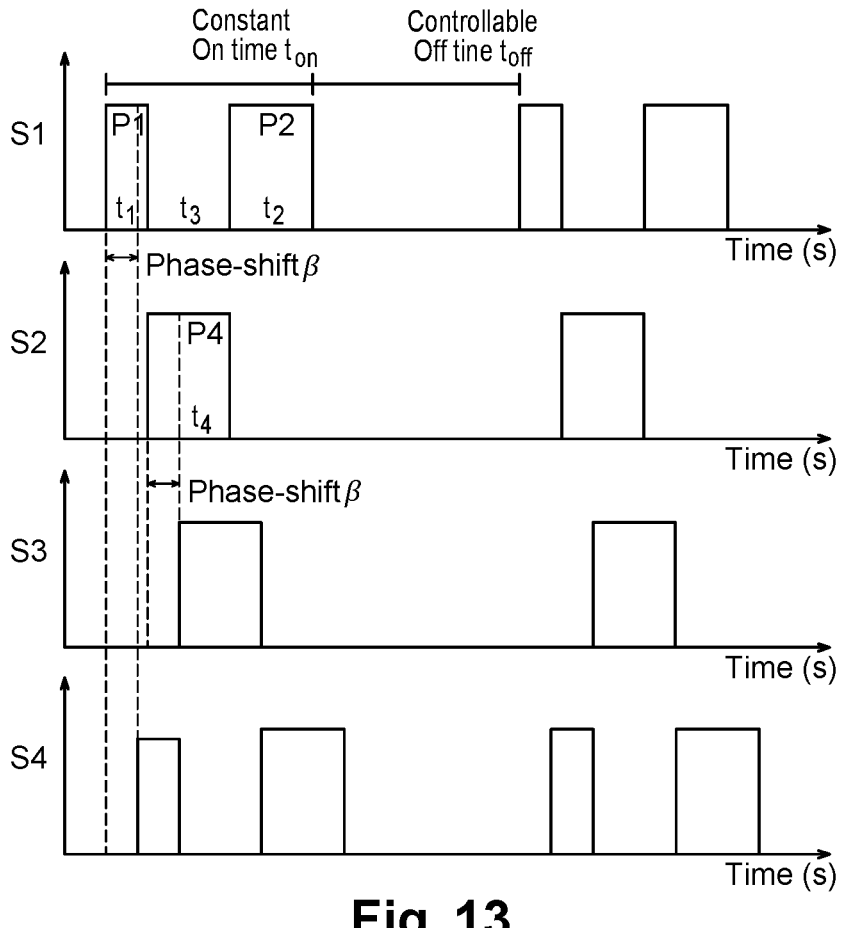

As can be seen on FIG. 13, in this mode of operation, for S1 and S4 the width t1 of pulse P1 is one half of the width t2 of pulse P2, and the off-time t3 is equal to t2. For S2 and S3, the width t4 of pulse P4 is equal to t3. This mode of operation is advantageous under light load conditions, as it allows to suppress acoustic noise generated by the power switches. According to advantageous embodiments, $\beta 1 = \beta 2$, and/or $\frac{1}{2} t1 = t2$ and/or $t2 = t3$ and/or $t4 = t3$.

In such an advantageous method to use this modulation technique, the on-time ton is constant and the off-time toff can be adjusted between a minimum value and a maximum value. Said minimum value of toff can be estimated as 2/fmax wherein fmax is the maximum frequency of the components (for instance 140 kHz in an advantageous embodiment of the invention). The maximum value of toff can be estimated as of the order of about 1 kHz in the same advantageous embodiment. The phase shift can be adjusted, too. The value of t2 is advantageously of the order of fmax/2.

This control technique according to the present invention combines burst mode with full bridge phase-shifting to step down high DC bus voltage or output voltage (Vbatt), depending on the power flow direction (Vbatt in battery charging mode, DC bus voltage in battery discharging mode). The benefit of the proposed control is achieving DC bus control at very light load without operating in the audible frequencies range. This is obtained by a method in which the burst mode control frequency is decreased until the audible noise limit (knowing that the acoustic frequency generated by the circuit decreases with increasing toff) and then the phase-shifting of the burst pulses is started. For an improved efficiency, the burst pulse pattern is based on OTC (Optimal Trajectory Control) version to avoid resonant current inrush and to obtain soft switching. For sake of control simplification, the phase-shift range is limited to its linear portion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

LIST OF REFERENCE NUMERALS

1 Battery charger
2 AC/DC converter
3 DC/DC converter
4 Boost inductance
5 Grid-side bridge
6 Battery-side bridge
7 Resonant tank circuit
8 Transformer
9 DC link capacitor bus
10 Proportional-integral (PI) controller
11 Phase-locked loop (PLL)
12 AC current controller
13 Battery current controller
14 Boost inductance

What is claimed is:

1. A grid-tied converter having a grid side that supplies an alternative current to the grid-tied converter, and a battery side that receives a direct current from the grid-tied converter, the grid-tied converter comprising:

an AC/DC converter; and a bidirectional resonant DC/DC converter for controlling injection and absorption of grid side active and reactive powers by controlling direct active and reactive power injection or absorption from or to grid side in ABC frame where no DQ transformation is used, and wherein absorbed active power is controlled by controlling a battery charging current, and wherein injected active power is controlled by controlling discharging currents, and reactive power is controlled by controlling a phase shift angle between power factor correction current and voltage for each grid phase, wherein the bidirectional resonant DC/DC converter includes a full-bridge coupled to a resonant tank and a power transformer and rectifier stage, said full-bridge comprising a first pair of power switches S1/S2 and a second pair of power switches S3/S4, the bidirectional resonant DC/DC converter being configured such that in a first mode of operation:

switch S1 and switch S4 are driven by a same two pulse pattern with a phase shift $\beta_1$, said two pulse pattern comprising a first pulse P1 of width $t_1$ and a second pulse P2 of width $t_2$, P1 and P2 being separated by an off-time $t_3$, and switch S2 and switch S3 are driven by a same single pulse pattern comprising pulse P4 of width $t_4$ with a phase shift $\beta_2$, wherein the grid-tied converter is configured to detect a grid configuration based on a grid side voltage and grid side angle measurement to determine a number of connected phases, and then automatically adapt a configuration of the grid-tied converter to the detected grid configuration.

2. The grid-tied converter of claim 1, further comprising a configurator having a detection system configured to detect the grid configuration between a single-phase grid configuration, a two-phase grid configuration, and a three-phase grid configuration.

3. The grid-tied converter of claim 2, wherein the configurator is provided with a system to configure a set of switches according to the detected grid configuration.

4. The grid-tied converter of claim 1, wherein:

the grid side is a three-phase grid and/or a single-phase grid, and the grid-tied converter is configured as a single-phase converter or a three-phase converter selected automatically upon the detected grid configuration.

5. The grid-tied converter of claim 1, further comprising a switching bridge comprising a full bridge, coupled to a resonant tank, a transformer and a rectifier, and an output capacitor.

6. The grid-tied converter of claim 1, wherein the grid-tied converter is configured to operate as a single phase converter and/or a three-phase converter.

7. The grid-tied converter of claim 6, wherein a configuration of the grid-tied converter as a single-phase converter or a three-phase converter is automatically selected upon the detected grid configuration.

8. A grid-tied converter having a grid side that supplies an alternative current to the grid-tied converter, and a battery side that receives a direct current from the grid-tied converter, the grid-tied converter comprising:

an AC/DC converter; and a bidirectional resonant DC/DC converter having a full-bridge coupled to a resonant tank and a power transformer and rectifier stage, said full-bridge comprising a first pair of power switches S1/S2 and a second pair of power switches S3/S4, the bidirectional DC/DC converter being operable for controlling:

injection and absorption of grid side active and reactive powers by controlling direct active and reactive power injection or absorption from or to grid side in ABC frame where no DQ transformation is used, battery charging current to control the absorbed active power, discharging currents to control an injected active power, and a phase shift angle between power factor correction current and voltage for each grid phase to control reactive power, a detection system configured to detect a grid configuration based on a grid side voltage and a grid side angle measurement to determine a number of connected phases, wherein the grid-tied converter is configured to automatically adapt a configuration of the grid-tied converter to the detected grid configuration, wherein in a first mode of operation of the bidirectional DC/DC converter:

switch S1 and switch S4 are driven by a same two pulse pattern with a phase shift $\beta_1$, said two pulse pattern comprising a first pulse P1 of width $t_1$ and a second pulse P2 of width $t_2$, P1 and P2 being separated by an off-time $t_3$, and switch S2 and switch S3 are driven by a same single pulse pattern comprising pulse P4 of width $t_4$ with a phase shift $\beta_2$.

\* \* \* \* \*